US011302182B2

(12) United States Patent
Yi et al.

(10) Patent No.: US 11,302,182 B2
(45) Date of Patent: Apr. 12, 2022

(54) SYSTEMS AND METHODS FOR VEHICLE IDENTIFICATION

(71) Applicant: Beijing Voyager Technology Co., Ltd., Beijing (CN)

(72) Inventors: Xiaoyong Yi, Fremont, CA (US); Liwei Ren, San Jose, CA (US); Jiang Zhang, San Jose, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 206 days.

(21) Appl. No.: 16/235,931

(22) Filed: Dec. 28, 2018

(65) Prior Publication Data

US 2020/0211369 A1 Jul. 2, 2020

(51) Int. Cl.
| | | |
|---|---|---|
| *G08G 1/017* | (2006.01) | |
| *G08G 1/052* | (2006.01) | |
| *G08G 1/056* | (2006.01) | |
| *G07C 5/00* | (2006.01) | |
| *G05D 1/00* | (2006.01) | |
| *G06K 9/00* | (2006.01) | |

(52) U.S. Cl.
CPC ........... *G08G 1/017* (2013.01); *G05D 1/0088* (2013.01); *G06K 9/00825* (2013.01); *G07C 5/008* (2013.01); *G08G 1/052* (2013.01); *G08G 1/056* (2013.01); *G05D 2201/0213* (2013.01)

(58) Field of Classification Search
CPC ........ G08G 1/017; G08G 1/015; G08G 1/054; G08G 1/052; G08G 1/056; G05D 1/0088; G05D 2201/0213; G06K 9/00825; G05B 2219/40191
See application file for complete search history.

(56) References Cited

U.S. PATENT DOCUMENTS

| | | | | |
|---|---|---|---|---|
| 6,982,654 B2 * | 1/2006 | Rau | ...................... | G08G 1/0175 340/539.1 |
| 8,191,915 B2 * | 6/2012 | Freese, V | ................ | B60D 1/58 280/477 |
| 9,952,594 B1 | 4/2018 | Zhao et al. | | |

(Continued)

FOREIGN PATENT DOCUMENTS

CN 107481526 A 12/2017

OTHER PUBLICATIONS

PCT International Search Report and the Written Opinion dated Mar. 29, 2019, issued in related International Application No. PCT/US2018/067988 (10 pages).

*Primary Examiner* — Ig T An
(74) *Attorney, Agent, or Firm* — Sheppard Mullin Richter & Hampton LLP (57) ABSTRACT

Systems and methods for vehicle identification are described herein. A set of vehicle identification information may be obtained from a set of autonomous vehicles. Individual vehicle identification information may convey identifications of one or more vehicles and locations of the one or more vehicles. Vehicle context information for individual vehicles may be determined from the set of vehicle identification information. The vehicle context information for the individual vehicles may describe a context of the individual vehicles. The context may include one or a combination of a speed of travel, a direction of travel, a trajectory, or an identity profile.

20 Claims, 3 Drawing Sheets

(56) References Cited

U.S. PATENT DOCUMENTS

| | | | |
|---|---|---|---|
| 2011/0095908 A1* | 4/2011 | Nadeem | B60H 3/00 340/905 |
| 2015/0338226 A1* | 11/2015 | Mason | G06Q 10/04 701/408 |
| 2016/0068156 A1* | 3/2016 | Horii | B60W 30/0956 701/28 |
| 2016/0357188 A1* | 12/2016 | Ansari | G06K 9/00805 |
| 2017/0120803 A1* | 5/2017 | Kentley | B60W 10/18 |
| 2017/0318360 A1* | 11/2017 | Tran | B33Y 80/00 |
| 2019/0325219 A1* | 10/2019 | Lin | G06K 9/00832 |
| 2020/0209851 A1* | 7/2020 | Iwamoto | B60W 40/09 |

* cited by examiner

Obtain Set Of Vehicle Identification Information From A Set Of Autonomous Vehicles
202

Determine Vehicle Context Information For Individual Vehicles
204

SYSTEMS AND METHODS FOR VEHICLE IDENTIFICATION

TECHNICAL FIELD

The disclosure relates generally to vehicle identification.

BACKGROUND

Some technologies such as automated license plate reader (ALPR) systems have been used to automatically capture data such as license plate numbers of vehicles that come into view, location, date, time, and/or photographs of the vehicle. This data may be uploaded to a central repository for use with many applications. An application may include law enforcement use to find out where a vehicle has been in the past, to determine whether a specific vehicle was at the spot of a crime, or to discover the travel patterns so that they are able to dig out more criminal activities. Another application may include use with a "hotlist" of identifications of stolen vehicles. Law enforcement may load the hotlist into an ALPR system to actively looking for those stolen vehicles and the vehicles relevant to criminals.

SUMMARY

One or more implementations of the systems and methods relate to vehicle identification using autonomous vehicles. An autonomous vehicle may be equipped with a set of sensors configured to generate output signals conveying information about the surroundings of the autonomous vehicle. For example, a sensor may include an image sensor configured to generate output signals conveying image information defining images of a surrounding environment. The images may be used to identify vehicles present in the environment and their locations. The autonomous vehicle may be part of a fleet of autonomous vehicles individually equipped with such sensors. The output of the sensors and/or information derived from the output of the sensors from the fleet of autonomous vehicles may facilitate a crowd-sourced technique vehicle identification. For example, information derived from different autonomous vehicles may be compared to determine one or a combination of vehicle identity profiles, speed of travel, direction of travel, or trajectory.

One aspect of the present disclosure is directed to a method for vehicle identification. The method may comprise: obtaining, from a set of autonomous vehicles, a set of vehicle identification information, individual vehicle identification information being obtained from an individual autonomous vehicle and conveying identifications of one or more vehicles and locations of the one or more vehicles; and determining, from the set of vehicle identification information, vehicle context information for individual vehicles of the one or more vehicles, the vehicle context information for the individual vehicles describing a context of the individual vehicles, the context including one or a combination of a speed of travel, a direction of travel, an identity profile, or a trajectory.

Another aspect of the present disclosure is directed to a system for vehicle identification. The system may comprise one or more processors and a memory storing instructions. The instructions, when executed by the one or more processors, may cause the system to perform: obtaining, from a set of autonomous vehicles, a set of vehicle identification information, individual vehicle identification information being obtained from an individual autonomous vehicle and conveying identifications of one or more vehicles and locations of the one or more vehicles; and determining, from the set of vehicle identification information, vehicle context information for individual vehicles of the one or more vehicles, the vehicle context information for the individual vehicles describing a context of the individual vehicles, the context including one or a combination of a speed of travel, a direction of travel, an identity profile, or a trajectory.

In some embodiments, the identifications may include one or a combination of a license plate number, a color, a make, a model, or a unique marking.

In some embodiments, individual vehicle identification information may include the identifications of the one or more vehicles.

In some embodiments, identifications of the one or more vehicles may be derived from the vehicle identification information. By way of non-limiting illustration, individual vehicle identification information may include one or a combination of image information or video information. The identifications of the one or more vehicles may be derived from the image information and/or video information through one or more image and/or video processing techniques.

In some embodiments, determining the context may be based on comparing individual ones of the identifications and the locations of the individual vehicles to other ones of the identifications and the locations of the individual vehicles.

In some embodiments, comparing the individual ones of the identifications of the individual vehicles to the other ones of the identifications of the individual vehicles may facilitate determining that multiples ones of the identifications are for a same vehicle based on matches between the individual ones of the identifications.

In some embodiments, the identity profile of an individual vehicle may represent an identity of the individual vehicle as a whole. The identity profile may be determined by combining multiples ones of the identifications determined to be for the same vehicle.

In some embodiments, the trajectory may include a path followed by a vehicle.

In some embodiments, the system may further perform tracking of a vehicle based on the set of vehicle identification information and/or vehicle context information.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that identify vehicles. One or more techniques presented herein may perform vehicle identification using a fleet of autonomous vehicles. The information collected from the autonomous vehicles may improve vehicle identification due to the distribution of the autonomous vehicles in an environment and due to the amount of information that may be retrieved from the autonomous vehicles providing a dense dataset through which vehicles may be identified.

Figure 1:
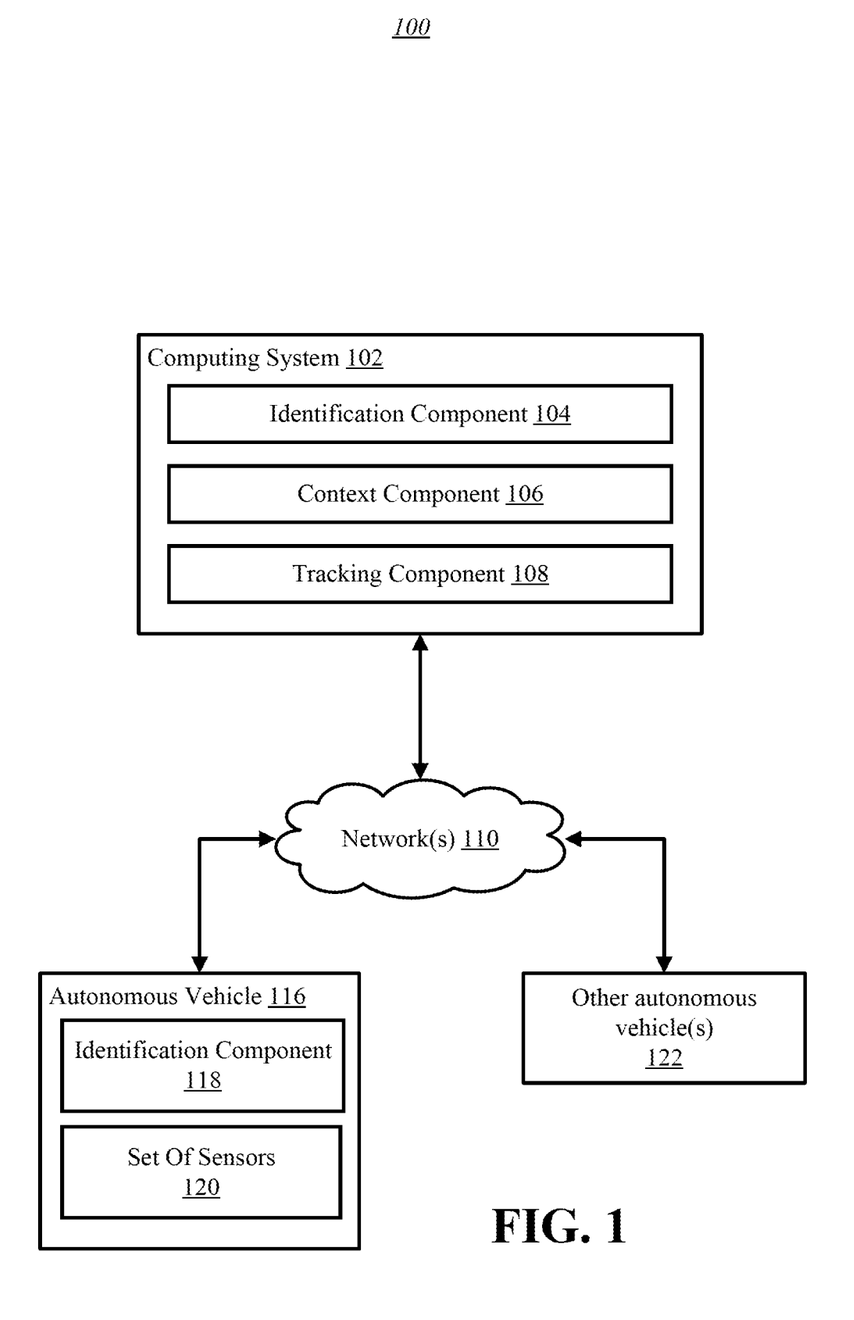
FIG. 1 illustrates an example environment for vehicle identification, in accordance with various embodiments of the disclosure.

FIG. 1 illustrates an example system 100 for vehicle identification, in accordance with various embodiments. The example system 100 may include one or a combination of a computing system 102, an autonomous vehicle 116, or one or more other autonomous vehicles 122.

It is noted that while some features and functions of the systems and methods presented herein may be directed to the autonomous vehicle 116, this is for illustrative purposes only and not to be considered limiting. For example, it is to be understood that other autonomous vehicle(s) included in the one or more other autonomous vehicles 122 may be configured the same as or similar to autonomous vehicle 116 and may include the same or similar components, described herein. The autonomous vehicle 116 and the one or more other autonomous vehicles 122 may represent a set of autonomous vehicles which may be part of a fleet of autonomous vehicles.

The autonomous vehicle 116 may include one or more processors and memory (e.g., permanent memory, temporary memory). The processor(s) may be configured to perform various operations by interpreting machine-readable instructions stored in the memory. The autonomous vehicle 116 may include other computing resources. The autonomous vehicle 116 may have access (e.g., via one or more connections, via one or more networks 110) to other computing resources or other entities participating in the system 100.

The autonomous vehicle 116 may include one or a combination of an identification component 118 or a set of sensors 120. The autonomous vehicle 116 may include other components.

The set of sensors 120 may include one or more sensors configured to generate output signals conveying vehicle identification information or other information. The vehicle identification information may convey identifications, locations, or combination of identifications and locations of one or more vehicles present in an environment surrounding autonomous vehicle 116. The identifications of the one or more vehicles may include one or a combination of a license plate number, one or more vehicle colors, a vehicle make (e.g., manufacturer), a vehicle model, or a unique marking. A license plate number may be comprised of one or a combination of alphanumeric characters or symbols. A unique marking may refer to one or a combination of decals, writing, damage, or other marking upon a vehicle. In some embodiments, the identifications may be partial identifications. By way of non-limiting illustration, a partial identification may include one or a combination of a part of a license plate number (less than all alphanumeric characters or symbols making up the license plate number), some of the colors of the vehicle (if the vehicle is multi-colored), or a make identification without a model.

The set of sensors 120 may include an image sensor, a set of image sensors, a location sensor, a set of location sensors, or a combination of image sensors, location sensors, and other sensors. A set of sensors (e.g., set of image sensors) may include one or more sensors (e.g., one or more image sensors).

An image sensor may be configured to generate output signals conveying image information and/or video information. The image information may define visual content in the form of one or more images. The video information may define visual content in the form of a sequence of images. Individual images may be defined by pixels and/or other information. Pixels may be characterized by one or a combination of pixel location, pixel color, or pixel transparency. An image sensor may include one or more of charge-coupled device sensor, active pixel sensor, complementary metal-oxide semiconductor sensor, N-type metal-oxide-semiconductor sensor, and/or other image sensor. In some embodiments, the identifications of the one or more vehicles may be derived from the image information or the video information through one or more image and/or video processing techniques. Such techniques may include one or a combination of computer vision, Speeded Up Robust Features (SURF), Scale-invariant Feature Transform (SIFT), Oriented FAST and rotated BRIEF (ORB), deep learning (of neural networks), or Optical Character Recognition (OCR).

In some implementations, a location sensor may be configured to generate output signals conveying location information. Location information derived from output signals of a location sensor may define one or a combination of a location of autonomous vehicle 116, an elevation of autonomous vehicle 116, a timestamp when a location was obtained, or other measurements. A location sensor may include one or a combination of a GPS, an altimeter, or a pressure sensor.

In some embodiments, individual vehicle identification information may include one or a combination of image information, video information, or identifications derived from the image information or video information. The identification component 118 may determine the identifications of the one or more vehicles from one or a combination of the image information or the video information through one or more of the image or video processing techniques described herein. In some implementations, the identifications may be included in the vehicle identification information or the vehicle identification information may include one or a combination of the image information or the video information from which the vehicle identification information may be derived.

The identification component 118 may communicate the vehicle identification information to the computing system 102 via one or more networks 110. The one or more networks 110 may include the Internet or other networks. The computing system 102 may obtain other vehicle identification information from other autonomous vehicle(s) 122. Accordingly, the computing system 102 may obtain a set of vehicle identification information.

The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks 110) to other computing resources or other entities participating in the system 100.

The computing system 102 may include one or a combination of an identification component 104, a context component 106, or a tracking component 108. While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 described herein may be implemented in one or more networks 110, one or more endpoints, one or more servers, or one or more clouds.

The identification component 104 may obtain, from a set of autonomous vehicles, a set of vehicle identification information. By way of non-limiting illustration, the identification component 104 may obtain vehicle identification information from autonomous vehicle 116 and individual ones of one or more other autonomous vehicles 122. The individual vehicle identification information obtained from an individual autonomous vehicle may include identifications, locations, or combinations of the identifications and locations of one or more vehicles.

In some embodiments, the vehicle identification information obtained by identification component 104 may include the identifications of vehicles. For example, autonomous vehicle 116 may determine the identifications of vehicles via identification component 118 and communicate the identifications to computing system 102.

In some embodiments, the identification component 104 may determine the identifications of vehicles from the vehicle identification information. By way of non-limiting illustration, the identification component 104 may obtain vehicle identification information including one or a combination of image information or video information. The identification component 104 may determine the identifications of vehicles using one or more image or video-based techniques described herein.

The context component 106 may determine, from the set of vehicle identification information, vehicle context information for individual vehicles of the one or more vehicles. By way of non-limiting illustration, the context component 106 may determine vehicle context information for autonomous vehicle 116 based on the vehicle identification information obtained from autonomous vehicle 116 and/or other vehicle identification information from other autonomous vehicles.

In some embodiments, the vehicle context information for an individual vehicles may describe a context of the individual vehicles. The context of the individual vehicles may describe circumstances specific to the individual vehicles. By way of non-limiting illustration, the context may include one or a combination of a speed of travel, a direction of travel, a trajectory, or an identity profile.

In some embodiments, determining the context may be based on comparing individual ones of the identifications and the locations of individual vehicles to other ones of the identifications and the locations of the individual vehicles.

The comparisons of individual ones of the identifications of the individual vehicles to the other ones of the identifications of the individual vehicles may facilitate determining that multiples ones of the identifications are for the same vehicle. For example, based on the comparisons, it may be determined that multiple ones of the identifications (obtained from the same or different autonomous vehicles) match. A match may convey a logical inference that the multiple identifications are for the same vehicle. In some implementations, matching may mean that identifications are the same or complementary.

In some implementations, being the same match may mean the identifications are within a threshold degree of sameness. By way of non-limiting illustration, for license plate identifications, two (or more) identifications may be determined to match if they depict the same series of alphanumerical characters or symbols or depict the same 90% of the series of alphanumerical characters or symbols. By way of non-limiting illustration, for color identifications, two (or more) identifications may be determined to match if they depict colors within a threshold range as observed on a color scale. By way of non-limiting illustration, for vehicle make identifications, two (or more) identifications may be determined to match if they depict the same make vehicle. By way of non-limiting illustration, for vehicle model identifications, two (or more) identifications may be determined to match if they depict the same model vehicle. By way of non-limiting illustration, for unique marking identifications, two (or more) identifications may be determined to match if they depict the same visual distinct unique marking in the same location of the vehicle.

In some implementations, being a complementary match may mean that multiple identifications may be partial identifications which, when combined, form a complete identification. The partial identifications may include depiction of different parts of the vehicle. That partial identification may include depiction of one or more overlapping parts of the vehicle. By way of non-limiting illustration, for license plate identifications, one identification may depict part of a series of alphanumerical characters or symbols and another identification may depict another part of the series of alphanumerical characters or symbols. The identifications may be combined to depict the series of alphanumerical characters or symbols defining the license plate number as a whole. By way of non-limiting illustration, for color identifications, one identification may depict a part of a vehicle having a color and another identification may depict another part of the vehicle having the same color. The identifications may be combined to depict the vehicle as a whole having the color uniform throughout. By way of non-limiting illustration, for unique marking identifications, one identification may depict part of a unique marking and another identification may depict another part of the unique marking. The identifications may be combined to depict the unique marking as a whole. In some implementations, combining identifications may be accomplished through stitching images and/or video together.

In some implementations, stitching may include operations such as one or a combination of feature point detection, image registration, alignment, or composing. Feature point detection may be accomplished through techniques such as SIFT and SURF. Image registration may involve matching features in a set of images. A method for image registration may include Random Sample Consensus (RANSAC) or other techniques. Alignment may include transforming an image to match a view point of another image. Composing may comprise the process where the images are aligned in such a way that they appear as a single shot of vehicle. In some embodiments, deep learning (of neural networks) based approaches may also be used.

In some implementations, the identity profile of an individual vehicle may represent an identity of the individual vehicle as a whole. The identity of the vehicle as a whole may comprise a representation of more than one identification which may have been obtained for the given vehicle. That is, the identity profile may be determined by combining multiples ones of the identifications (obtained from one or more autonomous vehicles) determined to be for the same vehicle. The identity profile may be made through the stitching techniques described herein which may result in one or more images which depict more than one identification. By way of non-limiting illustration, an identity profile of a vehicle may include an image or series of image from which two or more of a license plate number, a color, a make, a model, or a unique marking of the vehicle may be identifiable.

In some embodiments, determining one or a combination of the speed of travel, the direction of travel, or the trajectory of a vehicle may be based on comparing the individual locations associated with the multiples ones of the identifications determined to be for the same vehicle.

In some embodiments, a speed of travel may be represented by a distance traveled per unit. Determining a speed of travel of a vehicle may be accomplished by one or a combination of: comparing locations of identifications of the vehicle, determining distance between locations, determine time span(s) between the locations, or dividing the distance by the time span to obtain a speed of travel (e.g., distance per unit time). By way of non-limiting illustration, a speed of travel may specify a vehicle was traveling at 110 kilometers an hour.

In some embodiments, a direction of travel may be represented by cardinal directions. The cardinal directions may include north, south, east, and west. Determining a direction of travel may be accomplished by one or a combination of: comparing locations of identifications of the vehicle, determining which locations occurred before other ones of the locations, determining that the vehicle is traveling from a first location to a second location, and determining a pointing direction from the first location to the second location, or associating the pointing direction with a cardinal direction. By way of non-limiting illustration, a direction of travel may specify that a vehicle was traveling north.

In some embodiments, a trajectory of a vehicle may include a path followed by the vehicle. The trajectory may be specified with respect to one or a combination of named roads, highways, freeways, intersections, neighborhoods, or cities. In some implementations, locations may be referenced within a map of an environment including information about one or a combination of named roads, highways, freeways, intersections, neighborhoods, or cities. By way of non-limiting illustration, a mapping service may be accessed and used to cross reference the determined locations with the information conveyed in the map. A mapping service may include Google® Maps. By way of non-limiting illustration, a trajectory may specify that a vehicle traveled for two miles on a Main St., turned left and proceeded for six blocks on $1^{st}$ St., etc. In some implementations, how a vehicle's trajectory changes (or doesn't change) over time may reflect a travel pattern of the vehicle. A travel pattern may include a common trajectory which appears more than once.

The tracking component 108 may be configured to actively look for one or more vehicles using the set of vehicle identification information, vehicle context information, or a combination of vehicle identification information and vehicle context information. By way of non-limiting illustration, tracking component 108 may obtain identification(s) of a vehicle, for example through user input by a user designing to locate the vehicle. The tracking component 108 may monitor the set of vehicle identification information obtained from a fleet of autonomous vehicle and the vehicle context information determined therefrom. The tracking component 108 may perform such monitoring while looking for a match between the user-provided identification(s) and the identification conveyed by the set of vehicle identification information. The tracking component 108 may, in response to finding a match, provide the vehicle context information for the matched vehicle to the user through one or more user interfaces. By way of non-limiting illustration, the provided vehicle context information may include one or a combination of a speed of travel, a direction of travel, or a trajectory of the vehicle to allow the user to track the vehicle.

In some embodiments, autonomous vehicles may exchange notifications of vehicle identification information, requests for tracking, or a combination of requests and notifications. For example, autonomous vehicle 116 may send requests via identification component 118 to other autonomous vehicles 122 to identify a particular vehicle. The autonomous vehicle 116 may obtain requests via identification component 118 from other autonomous vehicles 122 to identify a particular vehicle. The autonomous vehicle 116 may notify, via identification component 118, other vehicles about an identified vehicle (e.g., by sending vehicle identification information). The autonomous vehicle 116 may obtain notifications, via identification component 118, from other vehicles about an identified vehicle (e.g., by receiving vehicle identification information). The requests and notifications may be sent to computer system 102, which in turn may forward the requests or notifications to autonomous vehicles nearby a requesting or notifying vehicle's GPS location, or may be sent directly from autonomous vehicle 116 to one or more nearby autonomous vehicles.

Figure 2:
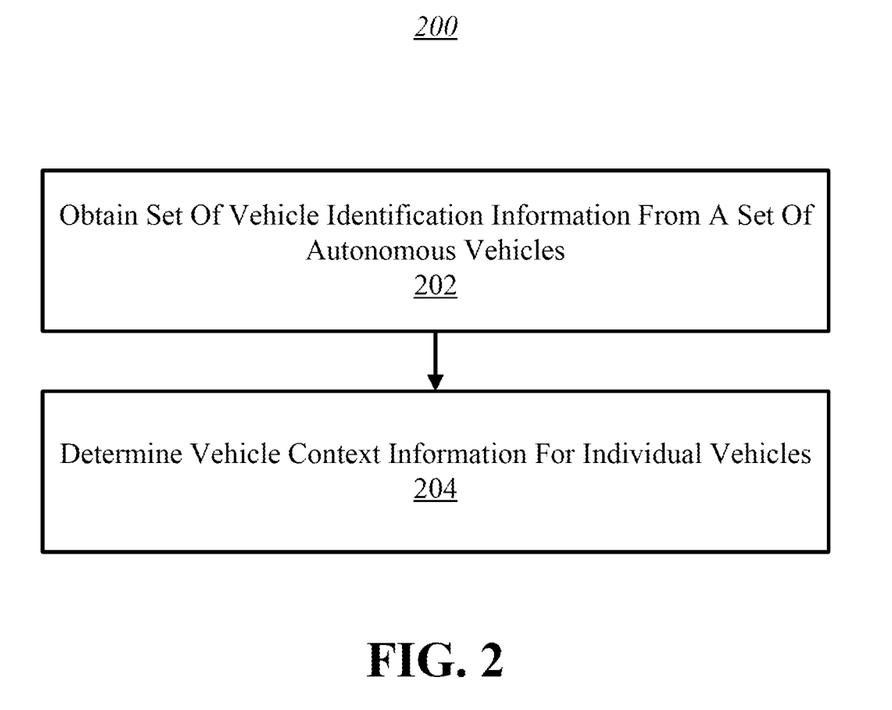
FIG. 2 illustrates an example flow chart of vehicle identification, in accordance with various embodiments of the disclosure.

FIG. 2 illustrates an example flow chart 200 for vehicle identification, in accordance with various embodiments of the disclosure. At block 202, a set of vehicle identification information may be obtained from a set of autonomous vehicles. The individual vehicle identification information may be obtained from an individual autonomous vehicle. The individual vehicle identification information may convey identifications of one or more vehicles and locations of the one or more vehicles. At a block 204, vehicle context information for individual vehicles may be determined from the set of vehicle identification information. The vehicle context information for the individual vehicles may describe a context of the individual vehicles.

Figure 3:
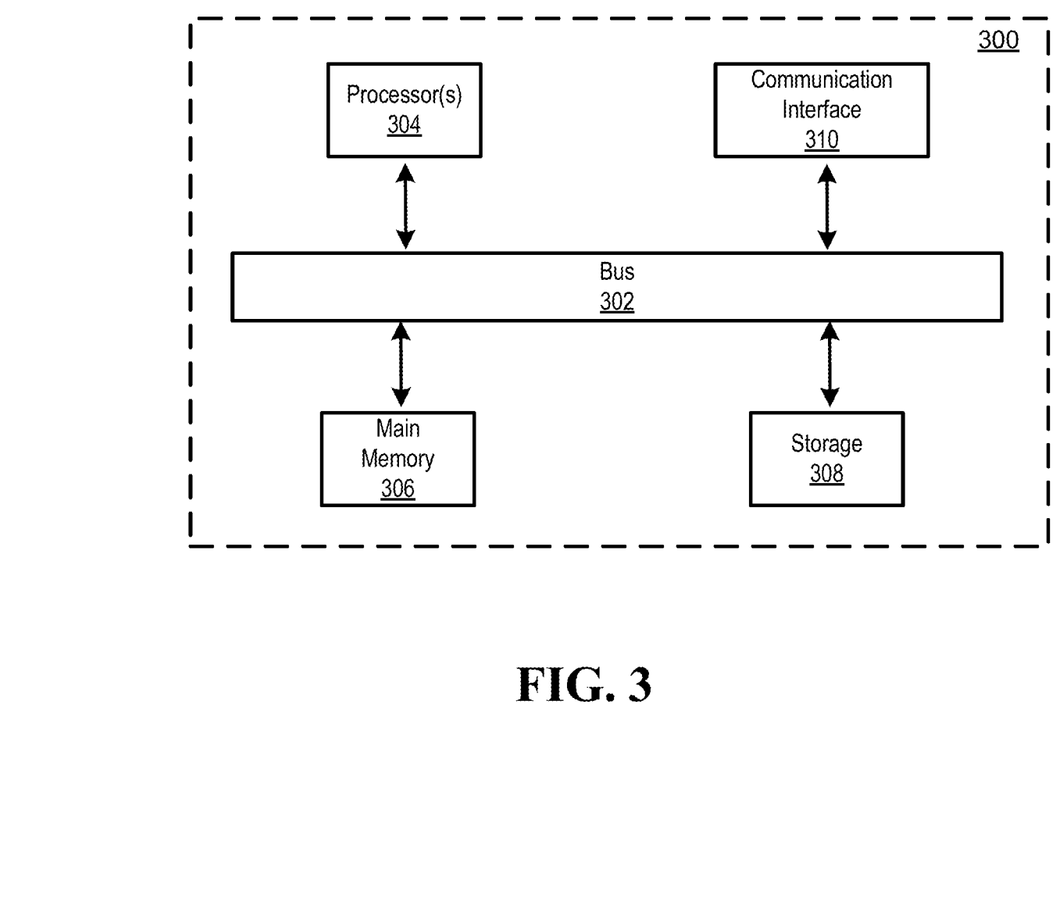
FIG. 3 illustrates a block diagram of an example computer system in which any of the embodiments described herein may be implemented.

FIG. 3 is a block diagram that illustrates a computer system 300 upon which any of the embodiments described herein may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 303, such as a random access memory (RAM), cache and/or other dynamic storage devices, coupled to bus 302 for storing information and instructions to be executed by processor(s) 304. Main memory 306 also may be used for storing temporary variables or other intermediate information during execution of instructions to be executed by processor(s) 304. Such instructions, when stored in storage media accessible to processor(s) 304, render computer system 300 into a special-purpose machine that is customized to perform the operations specified in the instructions. Main memory 306 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 308. Execution of the sequences of instructions contained in main memory 306 causes processor(s) 304 to perform the process steps described herein. For example, the process/method shown in FIG. 2 and described in connection with this figure can be implemented by computer program instructions stored in main memory 306. When these instructions are executed by processor(s) 304, they may perform the steps as shown in FIG. 2 and described above. In alternative embodiments, hard-wired circuitry may be used in place of or in combination with software instructions.

The computer system 300 also includes a communication interface 310 coupled to bus 302. Communication interface 310 provides a two-way data communication coupling to one or more network links that are connected to one or more networks. As another example, communication interface 310 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 and autonomous vehicle 116 may be described as performing or configured for performing an operation, when the components may comprise instructions which may program or configure the computing system 102 and autonomous vehicle 116 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for vehicle identification, the system comprising:
    one or more processors; and
    a memory storing instructions that, when executed by the one or more processors, cause the system to perform:
    receiving, from a requesting autonomous vehicle of a user via one or more networks, a request for identifying a target vehicle, wherein the request comprises an identification of the target vehicle;
    identifying a plurality of autonomous vehicles based on a GPS location of the requesting autonomous vehicle;
    forwarding, via the one or more networks, the request to the plurality of autonomous vehicles;
    obtaining, from the plurality of autonomous vehicles, a set of vehicle identification information,
        wherein each of the set of vehicle identification information is obtained from a corresponding autonomous vehicle in the plurality of autonomous vehicles, and comprises image information conveying identifications and locations of one or more vehicles that are in an environment surrounding the corresponding autonomous vehicle, and
        wherein the locations of the one or more vehicles are obtained from location sensors including at least one of a GPS, an altimeter, or a pressure sensor;
    searching for one or more pieces of the set of vehicle identification information by matching the identification of the target vehicle with a stitching result of the image information in the one or more pieces of vehicle identification information;
determining, from the one or more pieces of vehicle identification information, vehicle context information for the target vehicle,
wherein the vehicle context information for the target vehicle describes a context of the target vehicle, the context including at least one of: a speed of travel, a direction of travel, or a trajectory, and
wherein the determining the vehicle context information is based on comparing first vehicle identification information and second vehicle identification information from the set of vehicle identification information obtained from the plurality of autonomous vehicles; and
displaying the vehicle context information to the requesting autonomous vehicle of the user through one or more user interfaces.

2. The system of claim 1, wherein the identifications include one or a combination of a license plate number, a color, a make, a model, or a unique marking.

3. The system of claim 1, wherein the each of the set of vehicle identification information includes the identifications of the one or more vehicles.

4. The system of claim 1, wherein the each of the set of vehicle identification information includes a combination of the image information and video information, and the identifications of the one or more vehicles are derived from the image information and the video information through one or more image and/or video processing techniques.

5. The system of claim 1, wherein determining the vehicle context information is further based on comparing individual ones of the identifications and the locations of individual vehicles to other ones of the identifications and the locations of the individual vehicles.

6. The system of claim 5, wherein the comparing the individual ones of the identifications of the individual vehicles to the other ones of the identifications of the individual vehicles facilitates determining that multiple ones of the identifications are for a same vehicle based on matches between the individual ones of the identifications.

7. The system of claim 6, wherein the context further includes an identity profile of the target vehicle, the identity profile representing an identity of the target vehicle as a whole, and wherein the identity profile is determined by combining the multiple ones of the identifications determined to be for the same vehicle.

8. The system of claim 6, wherein determining a combination of the speed of travel, the direction of travel, or the trajectory is based on comparing individual locations of the multiple ones of the identifications determined to be for the same vehicle.

9. The system of claim 1, wherein the trajectory includes a path followed by the target vehicle.

10. The system of claim 1, wherein the system further performs tracking the target vehicle based on the set of vehicle identification information or the vehicle context information.

11. A method for vehicle identification, the method comprising:
receiving, from a requesting autonomous vehicle of a user via one or more networks, a request for identifying a target vehicle, wherein the request comprises an identification of the target vehicle;
identifying a plurality of autonomous vehicles based on a GPS location of the requesting autonomous vehicle;
forwarding, via the one or more networks, the request to the plurality of autonomous vehicles;
obtaining, from the plurality of autonomous vehicles, a set of vehicle identification information,
wherein each of the set of vehicle identification information is obtained from a corresponding autonomous vehicle in the plurality of autonomous vehicles, and comprises image information conveying identifications and locations of one or more vehicles that are in an environment surrounding the corresponding autonomous vehicle, and
wherein the locations of the one or more vehicles are obtained from location sensors including at least one of a GPS, an altimeter, or a pressure sensor;
searching for one or more pieces of the set of vehicle identification information by matching the identification of the target vehicle with a stitching result of the image information in the one or more pieces of vehicle identification information;
determining, from the one or more pieces of vehicle identification information, vehicle context information for the target vehicle,
wherein the vehicle context information for the target vehicle describes a context of the target vehicle, the context including at least one of: a speed of travel, a direction of travel, or a trajectory, and
wherein the determining the vehicle context information is based on comparing first vehicle identification information and second vehicle identification information from the set of vehicle identification information obtained from the plurality of autonomous vehicles; and
displaying the vehicle context information to the requesting autonomous vehicle of the user through one or more user interfaces.

12. The method of claim 11, wherein the identifications include one or a combination of a license plate number, a color, a make, a model, or a unique marking.

13. The method of claim 11, wherein the each of the set of vehicle identification information includes the identifications of the one or more vehicles.

14. The method of claim 11, wherein the each of the set of vehicle identification information includes one or a combination of the image information and video information, and the identifications of the one or more vehicles are derived from the image information and the video information through one or more image and/or video processing techniques.

15. The method of claim 11, wherein determining the vehicle context information is further based on comparing individual ones of the identifications and the locations of individual vehicles to other ones of the identifications and the locations of the individual vehicles.

16. The method of claim 15, wherein the comparing the individual ones of the identifications of the individual vehicles to the other ones of the identifications of the individual vehicles facilitates determining that multiple ones of the identifications are for a same vehicle based on matches between the individual ones of the identifications.

17. The method of claim 16, wherein the context further includes an identity profile, the identity profile of the target vehicle representing an identity of the target vehicle as a whole, and wherein the identity profile is determined by combining the multiple ones of the identifications determined to be for the same vehicle.

18. The method of claim 16, wherein determining a combination of the speed of travel, the direction of travel, or the trajectory is based on comparing individual locations of the multiple ones of the identifications determined to be for the same vehicle.

19. The method of claim 11, wherein the trajectory includes a path followed by the target vehicle.

20. The method of claim 11, further comprising tracking the target vehicle based on the set of vehicle identification information and/or the vehicle context information.

\* \* \* \* \*